US008750097B2

(12) United States Patent  
Maenpaa (10) Patent No.: US 8,750,097 B2
(45) Date of Patent: Jun. 10, 2014

(54) MAINTENANCE OF OVERLAY NETWORKS

(75) Inventor: Jouni Maenpaa, Nummela (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 212 days.

(21) Appl. No.: 12/996,125

(22) PCT Filed: Jun. 12, 2008

(86) PCT No.: PCT/EP2008/057401
§ 371 (c)(1),
(2), (4) Date: Jan. 3, 2011

(87) PCT Pub. No.: WO2009/149756
PCT Pub. Date: Dec. 17, 2009

(65) Prior Publication Data
US 2011/0296252 A1    Dec. 1, 2011

(51) Int. Cl.
*H04L 12/437* (2006.01)
(52) U.S. Cl.
USPC ............................................ 370/222; 370/453
(58) Field of Classification Search
USPC ............ 370/221–224, 241, 241.1, 242–245, 370/248, 249, 250; 714/48, E11.024, 714/E11.025; 398/1, 10–12, 16–21
See application file for complete search history.

(56) References Cited

U.S. PATENT DOCUMENTS

| | | | |
|---|---|---|---|
| 6,594,232 B1 * | 7/2003 | Dupont | 370/224 |
| 8,150,905 B2 * | 4/2012 | McKee et al. | 709/201 |
| 2005/0243722 A1 * | 11/2005 | Liu et al. | 370/235 |
| 2006/0039371 A1 * | 2/2006 | Castro et al. | 370/389 |
| 2008/0155520 A1 * | 6/2008 | Meloche et al. | 717/157 |

OTHER PUBLICATIONS

International Search Report, PCT Application No. PCT/EP2008/057401, Apr. 9, 2009.
International Preliminary Report on Patentability, PCT Application No. PCT/EP2008/057401, Sep. 17, 2010.
Yongchao et al. "Diagnose P2PSIP Overlay Network Failures draft-zheng-p2psip-diagnose-01" IETF Standard-Working-Draft, Internet Engineering Task Force, IETF, CH, No. 1, XP015054841 ISSN: 0000-0004, Feb. 23, 2008.
Jin et al. "Traceroute-Based Topology Inference without Network Coordinate Estimation" Communications, 2008. ICC '08. IEEE International Conference on, IEEE, Piscataway, NJ, USA, pp. 1615-1619, XP031265633 ISBN: 978-1-4244-2075-9, May 19, 2008.
Feamster et al.: "Measuring the effects of Internet path faults on reactive routing" Performance Evaluation Review ACM USA, vol. 31, No. 1, XP002521679 ISSN: 0163-5999, pp. 1-12, Jun. 2003.

(Continued)

*Primary Examiner* — Xavier S Wong
*Assistant Examiner* — M Mostazir Rahman
(74) *Attorney, Agent, or Firm* — Myers Bigel Sibley & Sajovec, PA (57) ABSTRACT

A method of managing a ring-based overlay network that is configured to allow routing of messages across an underlying IP network to destinations not specified by an IP address. The method comprises firstly sending a probe message from an initiating node of the overlay network around the ring, with each peer node forwarding the probe message to a successor or predecessor node. Upon detection of a forwarding failure at a node of the ring, a Probe error message is sent from that node to the initiating node. The initiating node represents the final destination for the Probe message.

18 Claims, 5 Drawing Sheets

(56) References Cited

OTHER PUBLICATIONS

Klemm et al. "On Routing in Distributed Hash Tables" The Seventh IEEE International Conference on Peer-to-Peer Computing, [Online] pp. 113-120, XP002521680, Galway, Ireland, Retrieved from the Internet: URL:http://ieeexplore.ieee.org/ Sep. 2-5, 2007.

Zhuang et al.: "On failure detection algorithms in overlay networks" INFOCOM 2005. 24th Annual Joint Conference of the IEEE Computer and Communications Societies. Proceedings IEEE Miami, FL, USA, Mar. 13-17 2005, Piscataway, NJ USA IEEE, vol. 3, pp. 2112-2123, XP010829335 ISBN: 978-0-7803-8968-7, Mar. 13, 2005.

Li et al.: "Comparing the performance of distributed hash tables under churn" Peer-To-Peer Systems III. Third International Workshop, IPTPS 2004. Revised Selected Papers (Lecture Notes in Computer Science vol. 3279) Springer-Verlag Berlin, Germany, 2004, XP002521681 ISBN: 3-540-24252-X.

Chinese Office Action Corresponding to Chinese Patent Application No. 200880129831.1; Date Mailed: Dec. 4, 2013; Foreign Text, 3 Pages, English Translation Thereof, 1 Page.

Chinese Office Action Corresponding to Chinese Patent Application No. 200880129831.1; Date Mailed: Jun. 26, 2013; Foreign Text, 4 Pages, English Translation Thereof, 5 Pages.

\* cited by examiner

MAINTENANCE OF OVERLAY NETWORKS

CROSS-REFERENCE TO RELATED APPLICATION

This application is a 35 U.S.C. §371 national stage application of PCT International Application No. PCT/EP2008/057401, filed on 12 Jun. 2008, the disclosure and content of which is incorporated by reference herein in its entirety. The above-referenced PCT International Application was published in the English language as International Publication No. WO 2009/149756 A1 on 17 Dec. 2009.

TECHNICAL FIELD

The present invention relates to a mechanism for maintaining an overlay network and more particularly for maintaining a ring-based overlay network such as, for example, a Distributed Hash Table overlay network.

BACKGROUND

Peer-to-peer or P2P networks make use of the pooled resources of participating nodes including processing capabilities and communication bandwidth to facilitate a wide variety of services including file sharing and VoIP telephony. In the absence of central servers, particular P2P services may make use of "overlay networks" to optimise resource location. An overlay network comprises nodes connected by virtual links representing paths extending across possibly many physical links in the underlying network (e.g. the Internet). Each node in the overlay network maintains a routing table containing a set of links to certain other nodes within the overlay network. Resource requests are passed between nodes until they arrive at a node which is responsible for that resource.

Distributed Hash Tables (DHT) provide an efficient means for mapping resource names ("keys") to locations within an overlay network. DHT makes use of a hashing algorithm to map keys, e.g. song titles, SIP URIs, etc, to a finite value space, e.g. 128 bits. The hashing algorithm is chosen to ensure a relatively uniform spread of hash values across the value space. Thus, for example, the hashing of 100 song titles will likely result in 100 hash values that are relatively evenly spaced across the value space. Nodes within an overlay network are identified by usernames, which are themselves hashed into respective hash values. Each node then becomes responsible for a set of hash values within the value space which neighbour its own value. In practice, a node will store locations (e.g. IP addresses) from which resources, matching resource names which it "owns", can be obtained. When a node in the overlay network receives a request for a resource, the node determines whether or not it owns the corresponding hash value. If so, it returns the location of the resource to the requester (via the overlay network). If it does not own the hash value, it inspects its routing table to identify that node within the table which has a hash value closest to the hash value of the request, and forwards the request to that node. The receiving node repeats the procedure, and so on until the request arrives at the node which does own the hash value corresponding to the request and which therefore knows the resource location.

Figure 1:
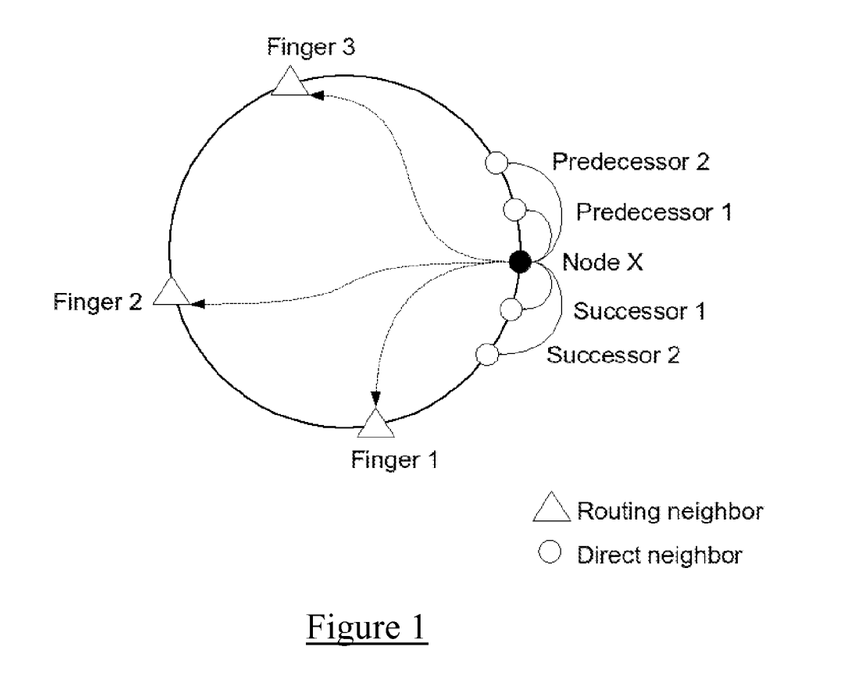
FIG. 1 illustrates schematically a DHT-based ring overlay network comprising a number of nodes.

FIG. 1 illustrates an overlay network organised as a ring (only a small number of the nodes within the ring are illustrated). In this example, each node maintains a routing table containing the locations and hash values of a small number of succeeding and preceding nodes in the ring, as well as for a small number of more distant nodes. In the illustrated network, a Node X maintains within its routing table locations for two successor nodes and two predecessor nodes, as well as for three remote nodes. Whilst a larger number of entries within the routing tables can make the network more efficient in terms of routing and more robust against node withdrawal, large tables are difficult to maintain and therefore increase the unreliability of the network. If a node of the overlay network is behind a Network Address Translation node (or NAT), "pinholes" are opened in the NAT for those peer nodes contained within the routing table.

A node within the overlay network ensures that the information in its routing table is up to date by attempting to contact its neighbours periodically. A number of different mechanisms may be used for this purpose:

1) A node can periodically send keep-alive messages to check that the other nodes listed in its routing table have not left the overlay network. This mechanism is used by DHT approaches such as Pastry [A. Rowstron and P. Druschel: Pastry: Scalable, distributed object location and routing for large-scale peer-to-peer systems. Middleware, 2001], Chord [I. Stoica, R. Morris, D. Karger, M. F. Kaashoek and H. Balakrishnan: Chord: A Scalable Peer-to-peer Lookup Service for Internet Applications. In Proceedings of the ACM SIG-COMM'01 Conference, August 2001, San Diego, Calif., USA.] and Content Addressable Network (CAN) [S. Ratsanamy, P. Francis, M. Handley, R. Karp and S. Shenker: A scalable content-addressable network. In Proceedings of ACM SIGCOMM 2001, August 2001].
2) A node can periodically send queries to learn about new nodes that could be inserted into the routing table, replacing old entries (e.g. Chord).
3) A node can periodically send queries to its direct neighbours requesting information about the entries in its neighbours' routing tables. This information is used to update the node's own routing table (e.g. Chord).
4) A node can periodically send its own routing table to its neighbours (e.g. CAN).

Another (additional) approach to maintaining the routing tables involves a node checking whether the originator of a resource request could be inserted into its routing table (e.g. Kademlia [P. Maymounkov and D. Mazieres: Kademlia: A peer-to-peer information system based on the xor metric. In Proceedings of IPTPS02, Cambridge, USA, March 2002]).

Figure 2:
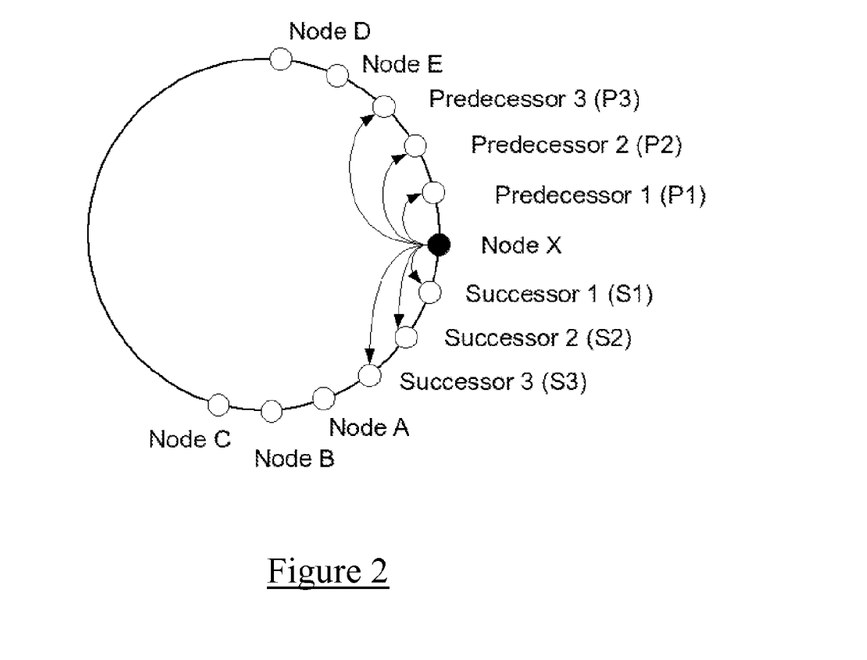
FIG. 2 further illustrates a DHT-based ring overlay network, showing neighbourhood relations between nodes.

Consider FIG. 2 which shows an example of neighbourhood relations in a DHT. In the Figure, a ring topology is assumed. Node X maintains three successors and three predecessor pointers in its routing table. It should already be clear that the reason for maintaining multiple successor and predecessor pointers is to increase robustness. If the probability that a single successors will fail is p, then the probability that all three successors will fail simultaneously is $p^3$. However, in extremely large real-world DHT-based overlay networks, this is not sufficient to maintain connectivity in the network; if all three successors (or alternatively, all three predecessors) of a given node leave the network within a sufficiently short period of time, the network fragments.

DHT-based overlay networks are fully distributed systems that can work without any centralized components. Such decentralized systems are very challenging from the viewpoint of network performance monitoring operations. In particular, the following issues arise:

Determining the total size of the network—there is no central server which can keep track of the number of users in the system. Many DHT algorithms need information about the size of the network to optimize their performance. As an example, in the Chord DHT algorithm [Stoica 2001], information concerning network size is needed, e.g. when selecting the size of the neighbor set, the frequency of DHT maintenance operations and the size of the routing (i.e. finger) table. If the size of the network is not known, a pre-configured and thus sub-optimal value needs to be used. This can have a very negative impact on network performance.

Correctness of network topology—for example how to detect the presence of loops in the network when the network is completely decentralized. If a loop is formed within the network, this will result in failed or incorrect lookups, degraded performance or even complete disruption of the operation of the network. A DHT based overlay network would benefit from the capability to automatically detect and fix loops.

Existence of network partitions (is there a path from any peer in the network to any other peer in the network)—how to connect disconnected network partitions that can be created due to churn. Previous studies [Rhea 2004, Li 2004] have shown that existing DHTs cannot handle high churn rates. Due to high churn, nodes can lose all of their predecessor or successors. If even a single node loses track of its neighbors even in one direction, the network becomes partitioned. As a result, lookups may return inconsistent values or fail altogether. A DHT based overlay network would benefit from the capability to recover from network partitions.

The collection of statistical and performance related information from the network. As a network may consist of hundred or even thousands of nodes, collecting real-time or near real-time information about the status of the network becomes problematic. Separately collecting periodic status reports from all of the nodes to obtain near real-time information of network state will clearly not scale (since to collect real-time information, frequent periodic message exchanges are needed between the monitoring node and each of the peers in the overlay network).

SUMMARY

According to a first aspect of the present invention there is provided a method of managing a ring-based overlay network that is configured to allow routing of messages across an underlying IP network to destinations not specified by an IP address. The method comprises firstly sending a probe message from an initiating node of the overlay network around the ring, with each peer node forwarding the probe message to a successor or predecessor node. Upon detection of a forwarding failure at a node of the ring, a Probe error message is sent from that node to the initiating node. The initiating node represents the final destination for the Probe message.

In order to allow forwarding nodes to send error messages directly to the initiating node, the initiating node includes its public IP address in the Probe message. The initiating node may also include a direction indicator indicating the direction around the overlay network that the message should take, i.e. clockwise or counter clockwise. This allows the initiating node to send a first probe message around the overlay network in a clockwise direction and a second probe message around the overlay network in a counter-clockwise direction. In the event that a section of the ring has become disconnected, error messages will be returned by both edges of the disconnect, allowing the initiating node to initiate reconnection.

The initiating node may include within said Probe message a unique message identifier, with nodes in the overlay network using the identifier to identify loops in the network, i.e. a node receiving a looping message will recognise that it has previously handled the message based upon the message identifier. The initiating node may include within said Probe message a time-to-live counter, the counter value being decremented at each node through which the message passes. Upon return of the Probe message to the initiating node, this time-to-live counter value may be used to determine the size of the overlay network.

Management data collected as a result of the sending of previous Probe messages may be included in a subsequent message by the initiating node. This data can then be used by nodes in the network to configure their operating parameters. To this end, upon receipt of a probe message at a node of the overlay network, the receiving node may include in the message capabilities and/or operating data of the node.

According to a second aspect of the present invention there is provided apparatus configured to operate in a ring-based overlay network for routing messages across an underlying IP network to destinations not specified by an IP address. The apparatus comprises a sending unit for sending a Probe message for onward transmission around the overlay network, and a receiving unit for receiving probe error messages from peer nodes within the overlay network, those peers having received the Probe message and detected an error in the overlay network. A processing unit is provided for associating the received probe error messages with the sent Probe message.

The sending unit may be arranged to include a unique message identifier within said Probe message, with said processing unit being arranged to associate the received probe error messages with the sent Probe message based upon the inclusion within the error messages of the unique message identifier.

The sending unit may be configured to send a first Probe message in first direction around the overlay network and to send a second probe message in a second direction around the overlay network. The processing unit is configured to detect the end nodes at a network disconnect on the basis of probe error messages returned from these endpoints.

The sending unit may be configured to include within said Probe message, management data collected as a result of the sending of previous Probe messages.

According to a third aspect of the present invention there is provided apparatus configured to operate in a ring-based overlay network for routing messages across an underlying IP network to destinations not specified by an IP address. The apparatus comprises a receiving unit configured to receive a Probe message from a neighbouring node within the overlay network. A first sending unit is provided and configured to attempt to forward the Probe message to another neighbouring node, continuing the direction of travel of the message around the network, i.e. clockwise or counter-clockwise. A processing unit of the apparatus is configured to detect an error in the message forwarding process and, in the event of such an error, to cause the sending unit to send a probe error message to the initiator of the Probe message.

Error messages may be triggered by a number of different causes, for example, a network disconnect, the presence of a forwarding loop, expiry of a time-to-live counter within the Probe message, or a message time out.

The processing unit may be configured to cause said sending unit to send said error message to an IP address of said initiator contained within the Probe message. The processing unit may be configured to extract management data from said probe message, and to configure operational parameters using the extracted data.

DETAILED DESCRIPTION

Ring based Distributed Hash Table (DHT) overlay networks are by their very nature ad hoc and therefore unpredictable both in terms of size and structure. A mechanism is proposed here that not only allows network size and structure to be analysed, but which allows the results of such analyses to be distributed across the network in an extremely efficient manner.

It is proposed here to send probe messages that traverse the overlay network, following successor or predecessor pointers. Nodes of the overlay network are configured to attempt to forward such probe messages to the next hop in the ring. The probe messages are used to monitor the status of the network, collect diagnostic information, detect loops and network partitions, determine the size of the network, distribute information in the network, etc. Probe messages are initiated by nodes that have a special role in the network, either because the node holds a token which makes it responsible for monitoring the status of the network or because it is acting as for instance as a "bootstrap" peer for the network. A bootstrap peer is the first point of contact for a node wishing to join the overlay network. Based upon information collected as a result of sending the probe messages, an initiator of the message and the nodes forwarding the Probe message can take corrective actions or adjust the parameters used to maintain the network.

Although the structure of the Probe message and the manner in which these messages are handled at nodes may be the subject of proprietary systems, it is also possible for these to be defined in relevant standards. One such standard is the IETF P2PSIP designed to allow the establishment of peer-to-peer sessions using overlay networks. In this case, the Probe message would be defined as a new message within the protocol.

A node that initiates a Probe message (i.e. generates a Probe message and injects it into the network) is referred to here as the "initiator" of the message. The initiator will also terminate the Probe message after it receives a Probe message that has gone around the ring and returned to the initiator. Probe messages can be sent either in the clockwise or counter-clockwise direction, or in both directions either simultaneously or alternately. The direction is specified in a header of the Probe message.

Probe messages are acknowledged in a hop-by-hop fashion. That is, each node receiving a Probe message sends an acknowledgement back to the neighbor from which it received the Probe message. This allows a node forwarding a Probe message on to the next hop node to detect if that next hop node has failed or withdrawn from the network (or if the intervening link has failed).

The following sections provide details about the information that may be included in Probe messages, the processing of Probe messages at individual nodes, the initiation of Probe messages, and about the ways in which the information collected by Probe messages can be used by the initiator and forwarding nodes.

Probe Message Retransmissions

In a typically ring based DHT overlay network, nodes are continually joining and leaving the overlay network, a process known as "churn". A peer may attempt to forward a Probe message to a successor or predecessor that has left the network since the sending node last performed a maintenance procedure. Particularly when the network is experiencing heavy churn, the probability that a Probe message will fail to complete a circuit of the ring is rather high. Therefore, if a Probe message forwarding operation at a given node times out, the forwarding node should repeatedly retransmit the Probe message until it receives an acknowledgement from the next hop node (a Probe retransmission will succeed once the DHT maintenance procedure has removed the failed next hop successor or predecessor and introduced an alternative node into the routing table of the sending node) or until a pre-specified number of retransmission attempts have been made. Of course, the number of re-transmission attempts may be specified in a header of the Probe message.

Selecting the Peer Responsible for Sending Probe Messages

Two alternative mechanisms are proposed here for assigning responsibility to send Probe messages.

1. Probe messages are sent only by bootstrap peers (or other special-purpose peers) of the network. Bootstrap peers are well-known peers that act as a first point of contact for nodes wishing to join the overlay network. Since it is the first point of contact, a bootstrap peer must always have a public IP address. The benefit of having a public IP address is that peers failing to forward a Probe message can send error messages to the originator of the message (i.e. the bootstrap peer) directly. The use of such error messages is described further below.

2. The responsibility for generating periodic Probe messages is passed from node to node in the network in the form of a special token. This token is a special message which is henceforth referred to as the ProbeToken message. A node receiving a ProbeToken message assumes responsibility for sending periodic Probe messages for a period of time specified in the ProbeToken message or until it leaves the network. Only peers having public IP addresses are allowed to hold the token. Peers with private IP addresses should forward the ProbeToken message immediately to their closest successor.

ProbeError Messages

A node receiving a Probe message might fail to successfully forward the message. This can happen for a number of reasons including: exceeding the maximum number of Probe message retransmission attempts (if a Probe message times out, the forwarding node will try to retransmit it until the number of retransmissions reaches the pre-specified maximum value; at this point, a ProbeError message is sent); exceeding the maximum "time-to-live" (TTL) of the message can be exceeded (described further below); the receiver has lost all of its successors or neighbors; the presence of a loop. In such error cases, the node detecting the error should inform the initiator of the Probe message by sending a special ProbeError message. This is sent directly, rather than via the overlay network. To make this possible, the initiator of a Probe message should include its contact information (IP address, port and Peer-ID) in the payload of the Probe message.

The ProbeError message should also identify the type of the error that has occurred, e.g. maximum number of Probe message retransmissions exceeded, TTL exceeded, loop, the sender does not know any successors or predecessors, etc. Error codes could be specified for each of these error cases. Additionally, the Peer-ID, IP address and/or port of the node towards which the sending has failed may be included in the ProbeError message to allow the initiator to learn, for example, if certain peers are repeatedly causing problems in the overlay network.

Learning the Size of the Network

Each Probe message is assigned a time-to-live (TTL) value. The purpose of the TTL value is twofold. First of all, it prevents Probe messages from looping indefinitely in an unstable overlay network. Each node receiving the Probe message decrements the TTL value by one. If a node receives a Probe message with a TTL value of one, that node should drop the Probe message and send a ProbeError message to the initiator indicating this situation. Secondly, assuming that the Probe message is able to complete its journey around the overlay network, when the initiator receives the Probe message on its return, it can calculate the size of the network by subtracting the remaining value of the TTL field from the original TTL value.

Detecting and Connecting Network Partitions

If the originator of a Probe message receives a ProbeError message indicating that the transmission of the Probe message failed because the forwarding node has lost track of all of its successors or predecessors, this means that the network has partitioned. However, if the sender of the ProbeError message includes its Peer-ID, IP address and port number in the message, the receiver of the message learns the identity of the peer at which the network partition starts. Assuming that the initiator has sent Probe messages simultaneously in both the clockwise and counter-clockwise directions, both the clockwise and counter-clockwise Probe messages will fail, and the initiator will learn the identities of the last node before the partition, both in the clockwise and counter-clockwise directions. This is illustrated in FIG. 3.

Figure 3:
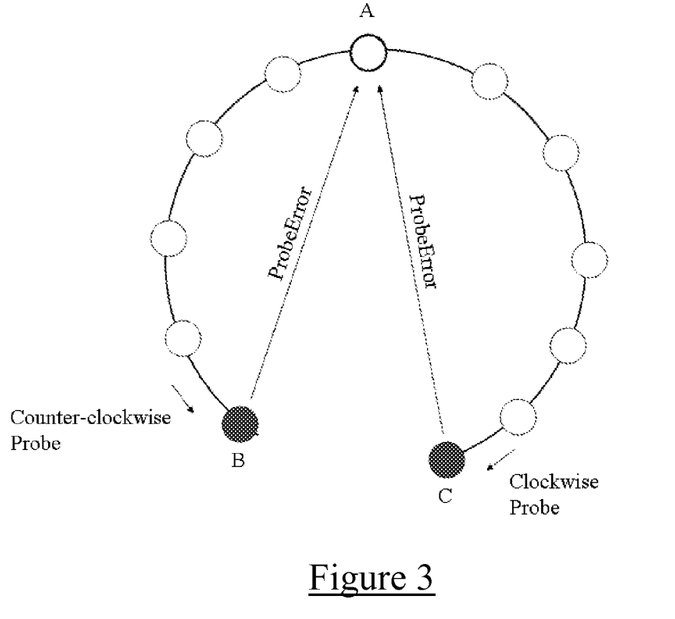
FIG. 3 illustrates a ring overlay network that has become partitioned, with both ends of the partition returning error message to the initiating node according to an embodiment of the invention.

According to the example of FIG. 3, the initiator of Probe messages (node A) receives two ProbeError messages. Node B has failed to forward the counter-clockwise Probe message since it has lost track of its predecessors. In the clockwise direction, node C has failed to forward the clockwise Probe message since it has lost track of its successors. However, since node A knows the starting points of the disconnected part of the ring (i.e. nodes B and C), it can instruct nodes B and C to connect to each other to thereby reconnect the network. More specifically, node A can send a special message (which is referred to here as an Update message) to node B, which indicates to node B that it should set node C as its first predecessor. Node A also sends another Update message to node C, in which it instructs node C to set node B as its first successor.

It will be appreciated that there may be nodes between node B and node C that are left out of the network after nodes B and C are told to contact each other. Such nodes will not receive Probe messages since they belong to a sector of the ring that has become disconnected from the main ring in both directions. The first and last nodes of such a sector will have lost all of their neighbors in one direction (either all successors or all predecessors). However, nodes are configured such that, if they do not receive Probe messages for a predefined period of time, they know that they have been disconnected from the main ring, and that they must attempt to rejoin the network (i.e. by sending a Join message to a node already in the overlay network). However, before re-joining, a node detecting that it belongs to a sector that has become disconnected from the main ring in both directions (i.e. from the fact that it has either lost all of its neighbors in one direction or has not received a Probe message for a pre-defined period of time) should inform the rest of the nodes in the disconnected sector that it is aware of, that they should also re-join the network. This can be achieved by sending a special message which is here referred to as the PerformRe-join message to those other nodes. If a node receiving a PerformRe-join message knows further nodes in the disconnected part which the originator does not know, then it should relay the message to those further nodes.

Loop Detection and Correction

Each Probe message should be assigned a unique identifier which is then carried in the payload of the Probe message. Each node receiving a Probe message maintains a cache containing the identifiers of the N most recent Probe messages. When receiving a Probe message, a node checks whether the identifier of the Probe message is already present in its cache. If it is, then a loop is present in the network.

Figure 4:
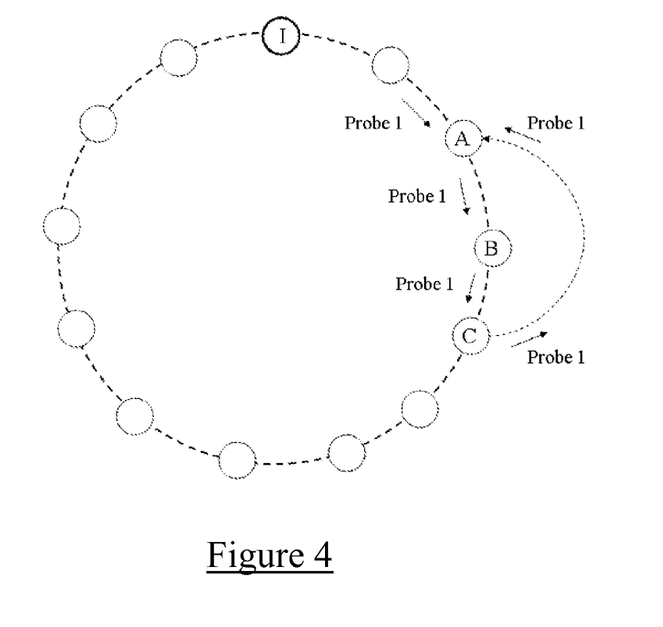
FIG. 4 illustrates message looping that can occur in a ring overlay network.

Considering the example scenario of FIG. 4, a Probe message sent in the clockwise direction visits first nodes A and B and then node C. Node C has an incorrect first successor pointer pointing to node A. If node A maintains a cache of recently seen Probe identifiers, it can detect that the Probe message that it receives from node C is looping (because it has already previously forwarded a Probe message with the same identifier).

If the Probe message contains a hop list containing the identities of the N previous nodes that the Probe message has visited, node A can learn the identity of the node that sent it the looping Probe message (i.e. node C) by checking the most recent entry in its hop list. Next, node A can inform node C that node C should remove and replace its incorrect first successor pointer. In order to achieve this, node A can send a special message which is referred to here as a LoopDetected message. Note that the LoopDetected message can be sent on the same connection on which the looping Probe message was received, meaning that presence of NATs is not an issue.

Upon receipt of the LoopDetected message, node C can initiate a loop correction procedure, or substitute its first successor with the second successor. For example, if the DHT algorithm is Chord, node C can attempt to correct the loop by searching for an alternative successor. Node C can do this by searching for the first node whose identifier follows node C's own identifier on the Chord ring (that is, node C can search for the first node whose identifier follows or is equal to the identifier C+1). The incorrect first successor can then be replaced with the returned node if the returned node is closer to node C than the previous successor.

Sending Probe Message along Back-Up Predecessor and Successor Pointers

DHT algorithms typically maintain multiple neighbor pointers. As an example, the Chord DHT algorithm maintains O(log(N)) successor pointers (that is the upper bound on the number of successors pointers that the Chord DHT algorithm maintains is log(N)., where N is the number of nodes in the network. In addition to sending Probe messages along the first successor and predecessor pointers, Probe messages can alternatively be sent along one of the second, third, fourth etc. neighbor pointers. A Probe message sent for example along third successor pointers visits only every third node in the DHT ring. This is advantageous for example when measuring the size of the network; the originator of the Probe message can learn the size of the network much faster if the Probe message does not visit every peer in the overlay network, but instead only every Mth peer. The size of the network can be calculated by multiplying the number of hops (as identified by the hop counter in the Probe message returned to the initiator) by M.

Of course, an additional mechanism is needed to ensure that the initiator of the Probe message will eventually receive the Probe message after it has travelled around the ring and does not skip over the initiator. Each forwarder of the Probe message must check whether the peer-ID of the initiator is contained within its successor set (or predecessor set if the Probe message was sent in the counter-clockwise direction). If the initiator is within the successor (or predecessor) set of the forwarder, the Probe message should be sent to the initiator instead of the Mth successor (or predecessor).

In summary, the Probe message preferably contains the following fields:

- A unique identifier for the Probe message. This identifier is generated by the initiator of the Probe request.
- The direction of the Probe message (i.e. clockwise or counter-clockwise).
- A Time-to-live (TTL) for the Probe message.
- The initiator's peer-ID, IP address and port (used when sending ProbeErrors to the initiator)
- M, which specifies to which successor or predecessor the Probe request should be forwarded. For example, if M has value '1', the Probe message should always be sent to the first successor/predecessor.
- A list of previous hops containing the Peer-ID, IP address and port of the N most recent hops (used in loop correction), where N is equal to or larger than zero.

In addition to the fields identified in the preceding paragraph, the Probe message can include counters that collect diagnostic information from the network. Each peer receiving a Probe message increments the counters, if appropriate. The initiator of the Probe message can then use the information for various purposes, such as write the information to a log, generate alarms, adjust network parameters etc. Examples of the additional field that can be carried in a Probe message include:

- Number of peers providing a specific service in the overlay, for example:
  - Number of peers providing a Session Traversal Utilities for NAT (STUN) service.
  - Number of peers proving a Traversal Using Relays around NAT (TURN) service.
- Number of bootstrap peers.
- Number of clients counter. Each peer adds to the value of this counter the number of clients it is serving. Clients are nodes that do not participate in the operation of the DHT, but use the services of the DHT through peers.
- Number or resource records stored by each peer. Each peer adds to the value of this counter the number of resource records it is storing.
- Number of nodes within the overlay network having a public IP address (this information may be interesting since only peers with public IP addresses can act in certain special roles, e.g. as bootstrap peers).
- Forwarding delay counter; each peer adds to the counter the time that it took the peer to forward the Probe message. This can be used to track how the load of the network varies over time.

If the maximum value of a specific counter is exceeded, the peer detecting this may generate a ProbeError message and send it to be initiator of the Probe message. In the ProbeError message, the sender should identify the value of the counter that was exceeded and the identifier of the Probe message. The sender of the Probe error message can then "wrap around" the value of the counter and forward the Probe message further. When the Probe message returns to the initiator, it can determine the correct value of the counter (by summing the various parts if necessary).

Figure 5:
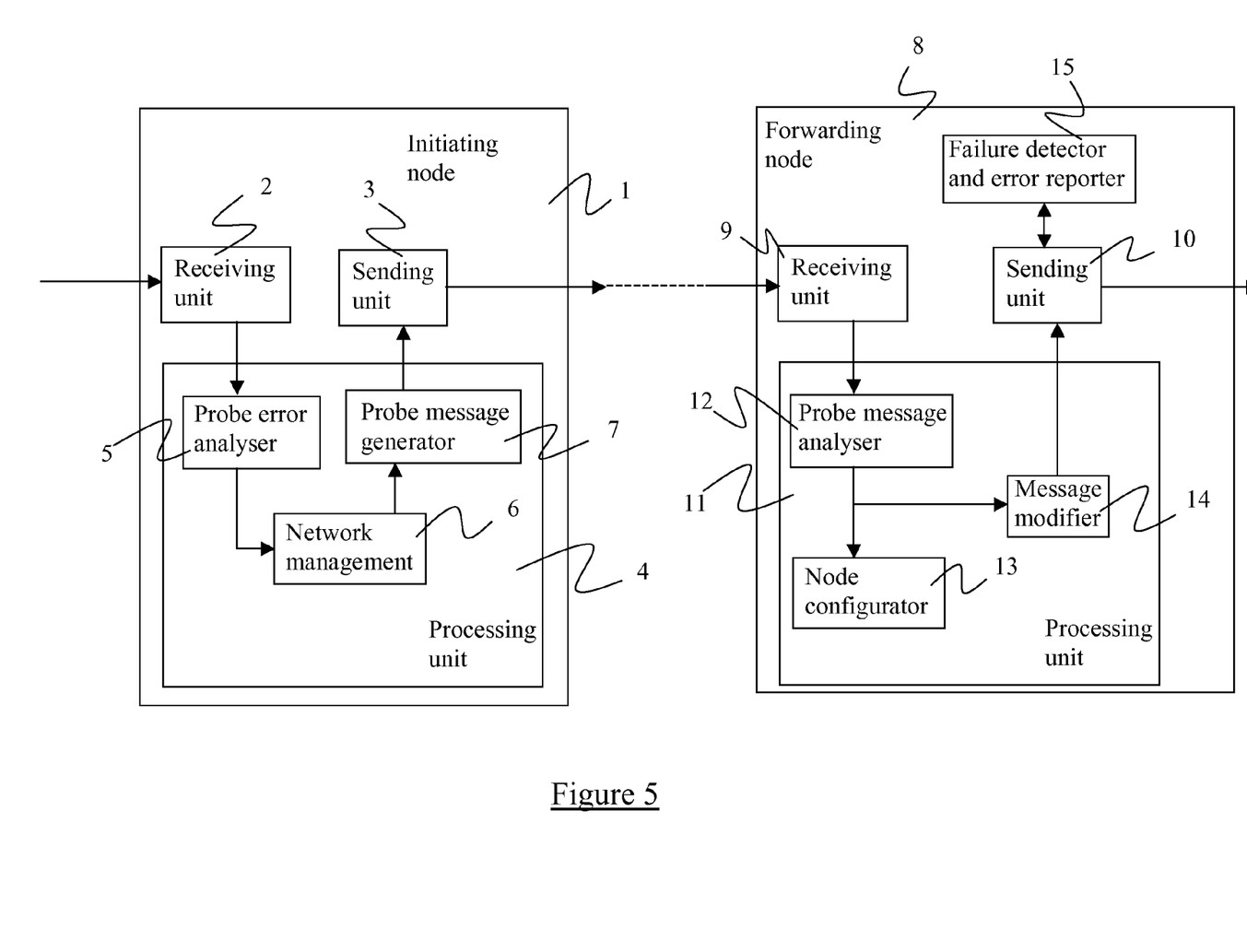
FIG. 5 illustrates nodes within an overlay network.

FIG. 5 illustrates schematically both an initiating node 1 and a forwarding node 8 of a DHT overlay network. The initiating node 1 comprises receiving and sending units 2,3 for handling incoming and outgoing messages (according to the overlay network protocol). A processing unit 4 comprises a network management unit 6 capable of maintaining details of network status and of distributing configuration data. The processing unit further comprises a Probe error message analyser 5 capable of handing Probe error messages and of detecting error status'. Report data is passed by the analyser 5 to the network management unit. Probe messages are generated by a Probe message generator 7 under the control of the network management unit 7.

Considering further the forwarding node 8, this also comprises receiving and sending units 9,10. A processing unit 11 comprises a probe message analyser 12 which analyses a received Probe message and determines the next hop for the message. It also determines whether or not the message contains data for configuring the node. The message is passed to a message modifier 14 and, optionally, to a node configurator 13. The message modifier 14 adds local data to the message if required, updates any counters, and passes the message to the sending unit 10. A failure detector and error reporter 15 detects and forwarding failure and sends Probe error messages as required to the initiating node 1.

Figure 6:
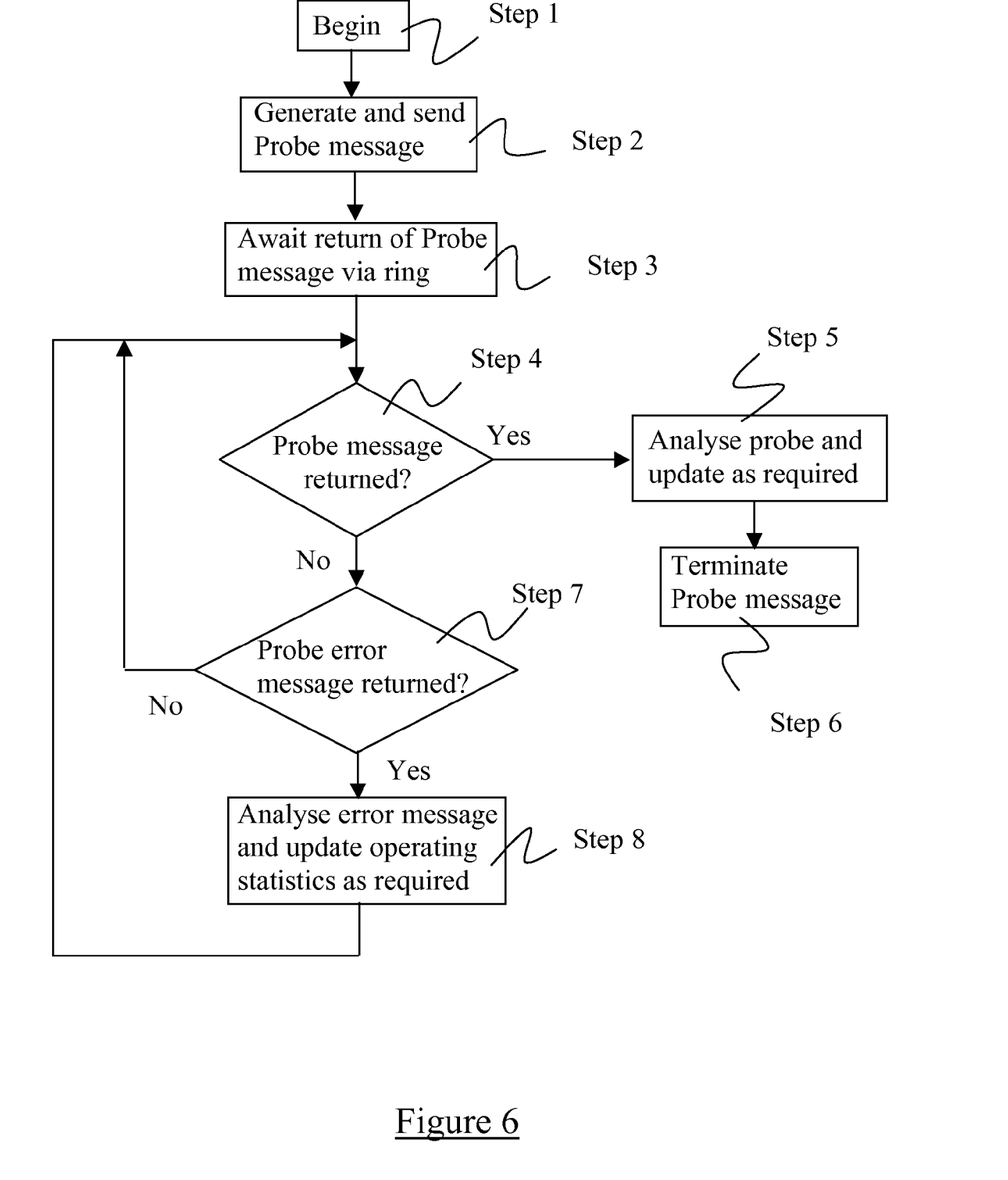
FIG. 6 is a flow diagram illustrating a process carried out at an initiating node.

FIG. 6 is a flow diagram illustrating the process carried out at an initiating node. The process begins at step 1, the node generating and sending a Probe message at Step 2. At Step 3, the node awaits the return of the message via the ring. If the Probe message is returned successfully at Step 4, data collected by the message is analysed at Step 5 and updates performed. The message is terminated at Step 6. In the event that a Probe error message is returned at Step 7, the error message is analysed at Step 8 and updates performed.

Figure 7:
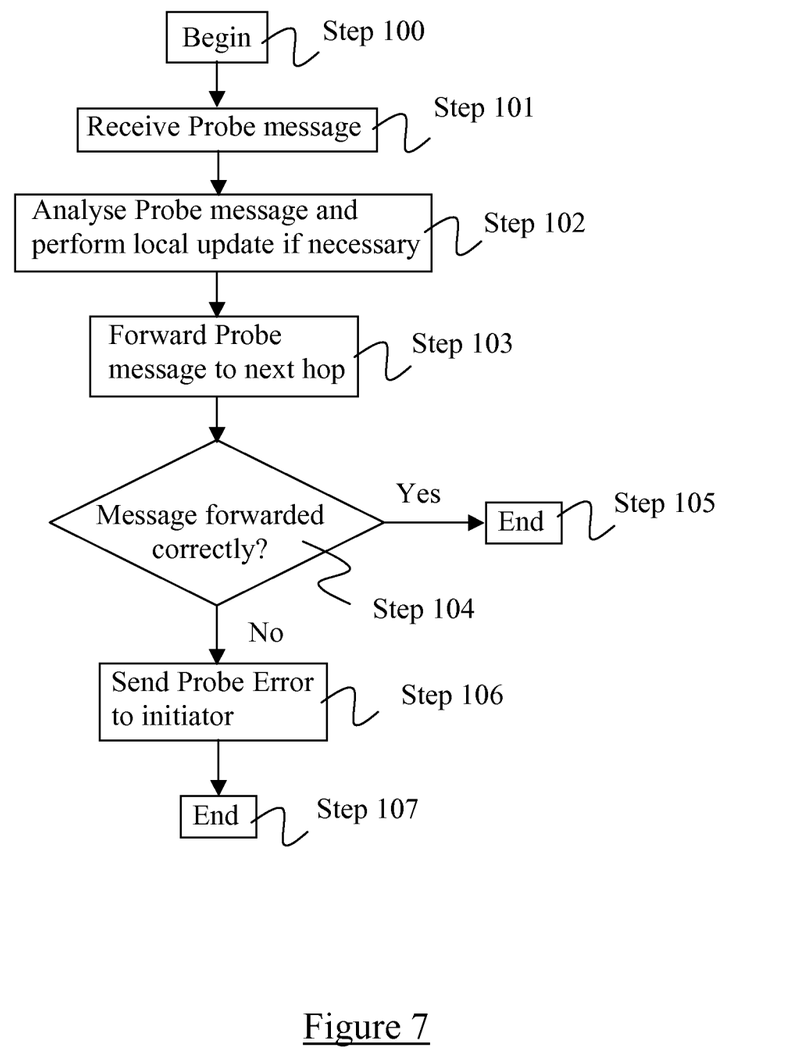
FIG. 7 is a flow diagram illustrating a process carried out at a forwarding node.

FIG. 7 is a flow diagram illustrating the process carried out at a forwarding node of the DHT overlay network. The process begins at Step 100, and a Probe message is received at Step 101. At Step 102 the message is analysed and any local update performed (e.g. if the message contains configuration data). At step 103 the message is forwarded to the next hop node. Successful forwarding of the message is monitored at Step 104. If the message is forwarded successfully, the handling process is terminated at Step 105. However, if the forwarding fails for any reason, at Step 106 a Probe error message is returned directly to the initiating node. Handling terminates at Step 107.

Information collected by the mechanism described above may be advantageously distributed to nodes participating in the overlay network by including the information in subsequent Probe messages. As an example, once it has been collected by one Probe message, the total size of the network can be communicated to the peers by including it in the next Probe message. Peer nodes receiving this information can use it, for example, to adjust the frequency of DHT maintenance operations. This approach to delivering information is much more efficient and scalable than sending a separate information update message to each peer node in the network.

In P2P networks used for interpersonal communication, such as in P2PSIP networks currently being standardized in the IETF, it is critical for a network operator to obtain real-time diagnostic information from the network. mechanism presented here provides a way to obtain such data without overloading the network. If Probe messages are sent for example every 60 seconds, then the proposed mechanism increases the forwarding load of a single node (and most importantly of the monitoring node terminating the Probe messages) by only a single message per minute.

It will be appreciated by those of skill in the art that various modifications may be made to the above described embodiment without departing from the scope of the present invention.

The invention claimed is:

1. A method of managing a ring-based overlay network configured to allow routing of messages across an underlying IP network to destinations not specified by an IP address, the method comprising:
sending a Probe message from an initiating node of the overlay network around the ring, with each peer node forwarding the Probe message to a next hop successor or predecessor node such that, in the absence of a partition failure within the network, the Probe message is returned to the initiating node, wherein sending the Probe message comprises:
simultaneously or alternately sending a first Probe message from the initiating node around the overlay network in a first direction and sending a second Probe message from the initiating node around the overlay network in a second direction opposite the first direction;
in response to detection at a given node in the ring of a forwarding failure, sending a probe error message from that given node to the initiating node; and
responsive to receipt of the probe error message at the initiating node when the probe error message indicates that a disconnect has arisen in the overlay network, initiating connection of two nodes at respective immediately-neighboring starting points of a disconnected section of the overlay network to reconnect the overlay network.

2. The method according to claim 1, further comprising:
in response to return of the Probe message to the initiating node, terminating the Probe message at the initiating node.

3. The method according to claim 1, further comprising:
at the initiating node, including a public IP address of the initiating node in the Probe message, and sending the probe error message from the given node directly to the public IP address.

4. The method according to claim 1, at the initiating node, including in the Probe message a direction indicator indicating the direction around the overlay network that the Probe message should take.

5. The method according to claim 4, further comprising:
sending the first Probe message from the initiating node around the overlay network in a clockwise direction and sending the second Probe message from the initiating node around the overlay network in a counter-clockwise direction.

6. The method according to claim 1, further comprising:
including in said Probe message a unique message identifier generated by the initiating node, and
operating nodes in the overlay network to use the identifier to identify loops in the overlay network.

7. The method according to claim 1, further comprising:
including in the Probe message a time-to-live counter, and decrementing the counter value at each node through which the Probe message passes.

8. The method according to claim 7, further comprising:
responding to return of the Probe message to the initiating node by using the time-to-live counter value to determine the size of the overlay network.

9. The method according to claim 1, wherein sending the Probe message from the initiating node comprises:
sending management data, collected as a result of sending previous Probe messages, in the Probe message from the initiating node around the ring, the management data being used by nodes in the overlay network to configure their operating parameters.

10. The method according to claim 1, further comprising:
responding to receipt of the Probe message at a node of the overlay network by including in the Probe message capabilities or operating data of the node.

11. Apparatus configured to operate in a ring-based overlay network for routing messages across an underlying IP network to destinations not specified by an IP address, the apparatus comprising:
a sending unit configured to send a Probe message for onward transmission around the overlay network for return to the apparatus in the absence of any partition failure within the network, wherein said sending unit is configured to simultaneously or alternately send a first Probe message in a first direction around the overlay network and send a second Probe message in a second direction opposite the first direction around the overlay network;
a receiving unit configured to receive probe error messages from peer nodes within the overlay network that have received the Probe message and detected an error in the overlay network; and
a processing unit configured to associate the received probe error messages with the sent Probe message, wherein when a probe error message indicates that a disconnect has arisen in the overlay network, the processing unit is further configured to respond to receipt of the probe error message at the apparatus by initiating connection of two nodes at respective immediately-neighboring starting points of a disconnected section of the overlay network to reconnect the overlay network.

12. The apparatus according to claim 11, wherein:
said sending unit is configured to include a unique message identifier within said Probe message, and
said processing unit is configured to associate the received probe error messages with the sent Probe message based upon the inclusion within the probe error messages of said unique message identifier.

13. The apparatus according to claim 11, wherein:
the processing unit is configured to detect end nodes at a network disconnect in response to probe error messages returned from the end nodes.

14. The apparatus according to claim 11, wherein said sending unit is configured to include within said Probe message, management data collected as a result of sending previous Probe messages.

15. Apparatus configured to operate in a ring-based overlay network for routing messages across an underlying IP network to destinations not specified by an IP address, the apparatus comprising:
a receiving unit configured to receive a Probe message from a neighbouring node within the overlay network;
a sending unit configured to attempt to forward the Probe message to a next hop neighbouring node to continue the direction of travel of the Probe message around the network, wherein said sending unit is configured to simultaneously or alternately send a first Probe message in a first direction around the overlay network and send a second Probe message in a second direction opposite the first direction around the overlay network; and
a processing unit configured to detect an error in the Probe message forwarding process and, in response to detecting the error, to cause the sending unit to send a probe error message to an initiator node of the Probe message, wherein when the probe error message indicates that a disconnect has arisen in the overlay network, the processing unit is further configured to respond to receipt of an update message from the initiator node to initiate connection of the apparatus with an immediately-neighboring starting point of a disconnected section of the overlay network to reconnect the overlay network.

16. The apparatus according to claim 15, wherein said error is one of:
   a network disconnect;
   presence of a forwarding loop;
   expiration of a time-to-live counter within the Probe message; and
   a message time out.

17. The apparatus according to claim 15, wherein said processing unit is configured to cause said sending unit to send said probe error message to an IP address of said initiator node contained within the Probe message.

18. The apparatus according to claim 15, said processing unit is configured to extract management data from said Probe message, and to configure operational parameters of the apparatus using the extracted data.

\* \* \* \* \*

UNITED STATES PATENT AND TRADEMARK OFFICE
CERTIFICATE OF CORRECTION

| | | |
|---|---|---|
| PATENT NO. | : 8,750,097 B2 | Page 1 of 1 |
| APPLICATION NO. | : 12/996125 | |
| DATED | : June 10, 2014 | |
| INVENTOR(S) | : Maenpaa | |

It is certified that error appears in the above-identified patent and that said Letters Patent is hereby corrected as shown below:

On Title Page 2, item (56), under "OTHER PUBLICATIONS", in Column 1, Line 8, delete "NJ USA" and insert -- NJ, USA, --, therefor.

In the Specification:

In Column 8, Line 52, delete "(that" and insert -- that --, therefor.

In Column 8, Line 54, delete "log(N).," and insert -- log(N), --, therefor.

In Column 10, Line 13, delete "network management unit 7." and insert -- network management unit 6. --, therefor.

In Column 10, Line 61, delete "network. mechanism" and insert -- network. Mechanism --, therefor.

In the Claims:

In Column 12, Line 8, in Claim 11, delete "Apparatus" and insert -- An apparatus --, therefor.

In Column 12, Line 49, in Claim 15, delete "Apparatus" and insert -- An apparatus --, therefor.

Signed and Sealed this
Sixteenth Day of September, 2014

Michelle K. Lee
*Deputy Director of the United States Patent and Trademark Office*